United States Patent
Park et al.

(10) Patent No.: US 9,851,917 B2
(45) Date of Patent: Dec. 26, 2017

(54) METHOD FOR DE-DUPLICATING DATA AND APPARATUS THEREFOR

(71) Applicant: POSTECH ACADEMY—INDUSTRY FOUNDATION, Gyeongbuk (KR)

(72) Inventors: Chan Ik Park, Gyeongsangbuk-do (KR); Se Jin Park, Daegu (KR)

(73) Assignee: POSTECH ACADEMY—INDUSTRY FOUNDATION, Gyeongbuk (KR)

( * ) Notice: Subject to any disclaimer, the term of this patent is extended or adjusted under 35 U.S.C. 154(b) by 298 days.

(21) Appl. No.: 14/201,606

(22) Filed: Mar. 7, 2014

(65) Prior Publication Data

US 2014/0258655 A1 Sep. 11, 2014

(30) Foreign Application Priority Data

Mar. 7, 2013 (KR) ........................ 10-2013-0024356

(51) Int. Cl.
*G06F 3/00* (2006.01)
*G06F 3/06* (2006.01)
*G06F 12/127* (2016.01)
*G06F 12/123* (2016.01)

(52) U.S. Cl.
CPC ............ *G06F 3/0641* (2013.01); *G06F 3/061* (2013.01); *G06F 3/0673* (2013.01); *G06F 3/0628* (2013.01); *G06F 3/0632* (2013.01); *G06F 3/0668* (2013.01); *G06F 12/123* (2013.01); *G06F 12/127* (2013.01)

(58) Field of Classification Search
CPC .... G06F 3/0628; G06F 3/0668; G06F 3/0641; G06F 3/0652; G06F 12/123; G06F 12/127

USPC ........ 711/162, 166, 170; 707/634, 637, 664, 707/692, 749, 785; 710/19, 36, 56, 60
See application file for complete search history.

(56) References Cited

U.S. PATENT DOCUMENTS

| | | | | |
|---|---|---|---|---|
| 7,747,584 | B1* | 6/2010 | Jernigan, IV | G06F 17/30156 707/692 |
| 8,095,577 | B1* | 1/2012 | Faibish | G06F 17/30091 707/823 |
| 8,799,595 | B1* | 8/2014 | Chatterjee | G06F 11/1456 711/162 |
| 8,806,160 | B2* | 8/2014 | Colgrove | G06F 3/0608 707/639 |
| 8,812,874 | B1* | 8/2014 | Clifford | G06F 21/6209 713/193 |

(Continued)

FOREIGN PATENT DOCUMENTS

| | | |
|---|---|---|
| JP | 0855049 A | 2/1996 |
| JP | 2008-135055 A | 6/2008 |

(Continued)

*Primary Examiner* — Reba I Elmore
(74) *Attorney, Agent, or Firm* — Osha Liang LLP

(57) ABSTRACT

Disclosed are a method for data de-duplication and an apparatus for the same. The method may comprise obtaining access property of data based on input request or output request for the data, determining de-duplication unit of the data based on the access property, and performing de-duplication on the data based on the de-duplication unit. Thus, data de-duplication rate may be determined adaptively based on input/output characteristics of data. Also, data de-duplication may be performed based on the determined data de-duplication rate so as to provide low input/output latency.

14 Claims, 5 Drawing Sheets

(56) References Cited

U.S. PATENT DOCUMENTS

| | | | |
|---|---|---|---|
| 9,081,771 B1* | 7/2015 | Faibish | G06F 17/30 |
| 2008/0005141 A1* | 1/2008 | Zheng | G06F 3/0608 |
| 2009/0132619 A1 | 5/2009 | Arakawa et al. | |
| 2009/0240737 A1* | 9/2009 | Hardisty | G06F 17/30067 |
| 2010/0088296 A1 | 4/2010 | Periyagaram et al. | |
| 2010/0161929 A1* | 6/2010 | Nation | G06F 9/5016 |
| | | | 711/170 |
| 2010/0250501 A1 | 9/2010 | Mandagere et al. | |
| 2010/0333116 A1* | 12/2010 | Prahlad | G06F 17/3002 |
| | | | 719/328 |
| 2011/0035548 A1* | 2/2011 | Kimmel | G06F 3/061 |
| | | | 711/114 |
| 2011/0179250 A1 | 7/2011 | Matsuzawa et al. | |
| 2012/0017043 A1* | 1/2012 | Aizman | G06F 11/1076 |
| | | | 711/114 |
| 2012/0079184 A1* | 3/2012 | Jaquette | G06F 3/0611 |
| | | | 711/111 |
| 2012/0131025 A1* | 5/2012 | Cheung | G06F 17/30159 |
| | | | 707/755 |
| 2012/0143835 A1 | 6/2012 | Aronovich et al. | |
| 2012/0233417 A1 | 9/2012 | Kalach et al. | |
| 2012/0254257 A1* | 10/2012 | Mitra | G06F 17/30129 |
| | | | 707/803 |
| 2013/0091102 A1* | 4/2013 | Nayak | G06F 3/0613 |
| | | | 707/692 |
| 2013/0117240 A1* | 5/2013 | Taylor | G06F 17/30132 |
| | | | 707/690 |
| 2013/0218851 A1 | 8/2013 | Yamakawa | |
| 2013/0282672 A1* | 10/2013 | Tashiro | G06F 3/0608 |
| | | | 707/692 |

FOREIGN PATENT DOCUMENTS

| | | |
|---|---|---|
| JP | 2012238038 A | 12/2012 |
| WO | 2008070484 A2 | 6/2008 |

* cited by examiner

| TYPE | FIELD | REMARK |
| --- | --- | --- |
| TIME TYPE | m_time | RECENT MODIFICATION TIME |
| TIME TYPE | a_time | RECENT ACCESS TIME |
| INTEGER TYPE | seqCount | SEQUENTIAL ACCESS NUMBER |
| INTEGER TYPE | randCount | RANDOM ACCESS NUMBER |

FIG. 5

| CLASSIFICATION | DE-DUPLICATION UNIT | REMARK |
|---|---|---|
| DATA WHICH IS NOT USED FREQUENTLY | FIRST DE-DUPLICATION UNIT | - USING SMALLEST CHUNK<br>- HIGHEST DE-DUPLICATION PROBABILITY |
| DATA TO WHICH RANDOM ACCESS IS FREQUENTLY PERFORMED | SECOND DE-DUPLICATION UNIT | - USING RELATIVELY SMALL CHUNK<br>- RELATIVELY HIGH DE-DUPLICATION PROBABILITY |
| DATA TO WHICH SEQUENTIAL ACCESS IS FREQUENTLY PERFORMED | THIRD DE-DUPLICATION UNIT | - USING RELATIVELY LARGE CHUNK<br>- RELATIVELY LOW DE-DUPLICATION PROBABILITY |
| DATA TO WHICH INPUT IS FREQUENTLY PERFORMED | FOURTH DE-DUPLICATION UNIT | - DE-DUPLICATION IS NOT PERFORMED |

FIG. 6

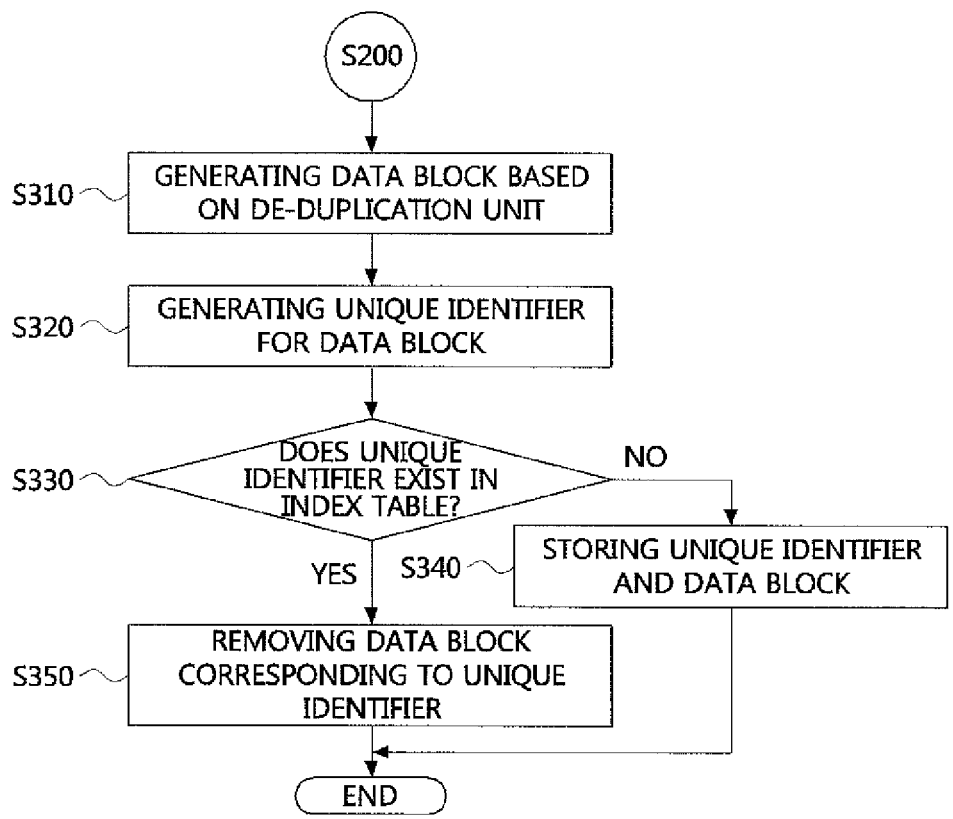

METHOD FOR DE-DUPLICATING DATA AND APPARATUS THEREFOR

CLAIM FOR PRIORITY

This application claims priorities to Korean Patent Application No. 10-2013-0024356 filed on Mar. 7, 2013 in the Korean Intellectual Property Office (KIPO), the entire contents of which are hereby incorporated by references.

BACKGROUND OF INVENTION

1. Technical Field

Example embodiments of the present invention relate to a technology for de-duplicating data, and more specifically to a method for de-duplicating data which provides low input-output latency, and an apparatus for the same.

2. Related Art

A technology of data de-duplication means a technology for removing redundant data in a data storage device and retaining more space in the data storage device. Currently, many companies and government offices are performing periodic data backup in order to guarantee secure data storing. In these cases, backup data has much redundancy due to its characteristics. Accordingly, the technology of data de-duplication is being used for increasing efficiency of backup data storage. Meanwhile, such the technology of data de-duplication has been developed in order to only increase data de-duplication rate because low input/output latency is not so necessary for the backup data storage devices.

However, since data de-duplication is performed based on complex algorithms for data de-duplication, portable devices such as notebook computers, smartphones, and tablets are not suitable for performing the data de-duplication due to their low computation powers. That is, when the data de-duplication technology is applied to the portable devices, there can be a problem that data input/output speed degrades significantly because physical storing order of sequential input/output data may change.

SUMMARY

Accordingly, example embodiments of the present invention are provided to substantially obviate one or more problems due to limitations and disadvantages of the related art.

Example embodiments of the present invention provide a method for data de-duplication which performs data de-duplication based on data de-duplication rate determined adaptively according to data input/output characteristics.

Example embodiments of the present invention also provide an apparatus for data de-duplication which performs data de-duplication based on data de-duplication rate determined adaptively according to data input/output characteristics.

In some example embodiments, a method for data de-duplication, performed in an apparatus for data de-duplication, may comprise obtaining access property of data based on input request or output request for the data, determining de-duplication unit of the data based on the access property, and performing de-duplication on the data based on the de-duplication unit.

Here, the access property may include at least one of access time on the data, modification time on the data, a number of sequential accesses on the data, and a number of random accesses on the data.

Here, the obtaining access property may further comprise obtaining the access time and the modification time based on time information of the input request when the input request is received, and obtaining the number of sequential accesses on the data or the number of random accesses on the data based on continuity of the input request.

Here, the obtaining access property may further comprise obtaining the access time based on time information of the output request when the output request is received, and obtaining the number of sequential accesses on the data or the number of random accesses on the data based on continuity of the output request.

Here, the determining de-duplication unit of the data may comprise calculating a first difference between a current access time on the data and a previous modification time on the data; determining a fourth de-duplication unit having a lowest de-duplication probability as the de-duplication unit of the data when the first difference is equal to or less than a predefined first threshold; calculating a second difference between the current access time on the data and the previous access time on the data when the first difference is in excess of the first threshold; determining a first de-duplication unit having a highest de-duplication probability as the de-duplication unit of the data when the second difference is in excess of a predefined second threshold; determining a second de-duplication unit having a lower de-duplication probability than the first de-duplication unit as the de-duplication unit of the data when the second difference is equal to or less than the second threshold and the number of random accesses on the data is equal to and more than the number of sequential accesses on the data; and determining a third de-duplication unit having a lower probability of being de-duplicated than the second de-duplication unit as the de-duplication unit of the data when the second difference is equal to or less than the second threshold and the number of random accesses on the data is less than the number of sequential accesses on the data.

Here, de-duplication may not be performed for the fourth de-duplication unit.

Here, the performing de-duplication on the data may comprise generating at least one data block of the data based on the de-duplication unit; generating unique identifier for the at least one data block; determining whether the unique identifier is in an index table or not; removing a data block corresponding to the unique identifier when the unique identifier is in the index table; and storing the unique identifier and the data block corresponding to the unique identifier when the unique identifier is not in the index table.

Here, the unique identifier may be generated using a hash algorithm.

Here, the de-duplication unit may be classified into at least one de-duplication units each of which has different de-duplication probability.

In another example embodiments, an apparatus for data de-duplication may comprise a processing part configured to obtain access property of data based on input request or output request for the data, determine de-duplication unit of the data based on the access property, and perform de-duplication on the data based on the de-duplication unit; and a storage part configured to store information which is processed or has been processed in the processing part.

Here, the access property may include at least one of access time on the data, modification time on the data, a number of sequential accesses on the data, and a number of random accesses on the data.

Here, the processing part may be further configured to obtain the access time and the modification time based on time information of the input request when the input request is received, and obtain the number of sequential accesses on the data or the number of random accesses on the data based on continuity of the input request.

Here, the processing part may be further configured to obtain the access time based on time information of the output request when the output request is received, and obtain the number of sequential accesses on the data or the number of random accesses on the data based on continuity of the output request.

Here, the processing part may be further configured to calculate a first difference between a current access time on the data and a previous access time on the data, determine a fourth de-duplication unit having a lowest de-duplication probability as the de-duplication unit of the data when the first difference is equal to or less than a predefined first threshold, calculate a second difference between the current access time on the data and the previous access time on the data when the first difference is in excess of the first threshold, determine a first de-duplication unit having a highest de-duplication probability as the de-duplication unit of the data when the second difference is in excess of a predefined second threshold, determine a second de-duplication unit having a lower de-duplication probability than the first de-duplication unit as the de-duplication unit of the data when the second difference is equal to or less than the second threshold and the number of random accesses on the data is equal to and more than the number of sequential accesses on the data, and determine a third de-duplication unit having a lower de-duplication probability than the second de-duplication unit as the de-duplication unit of the data when the second difference is equal to or less than the second threshold and the number of random accesses on the data is less than the number of sequential accesses on the data.

Here, de-duplication may not be performed for the fourth de-duplication unit.

Here, the processing part may be further configured to generate at least one data block of the data based on the de-duplication unit, generate unique identifier for the at least one data block, determine whether the unique identifier is in an index table or not, remove a data block corresponding to the unique identifier when the unique identifier is in the index table, and store the unique identifier and the data block corresponding to the unique identifier when the unique identifier is not in the index table.

Here, the unique identifier may be generated using a hash algorithm.

Here, the de-duplication unit may be classified into at least one de-duplication units each of which has different de-duplication probability.

BRIEF DESCRIPTION OF DRAWINGS

Example embodiments of the present invention will become more apparent by describing in detail example embodiments of the present invention with reference to the accompanying drawings, in which:

FIG. 5 is a table to explain de-duplication units used in an example embodiment of the present invention;

FIG. 6 is a flow chart to illustrate a step of performing de-duplication in a method for data de-duplication according to an example embodiment of the present invention;

DESCRIPTION OF EXAMPLE EMBODIMENTS

Figures 1, 2:
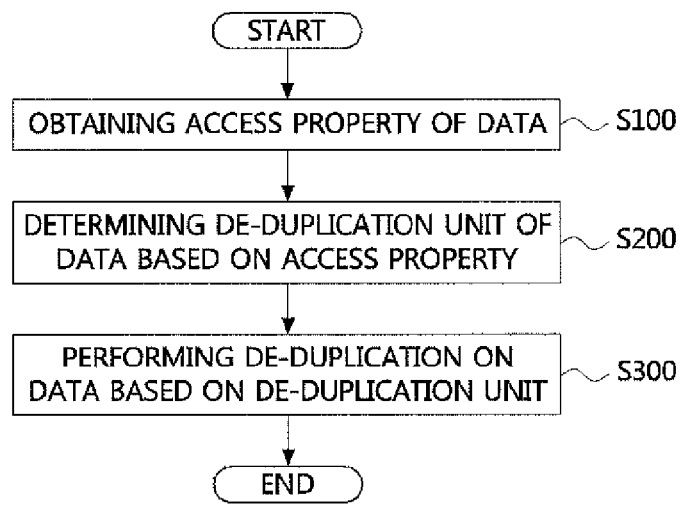
FIG. 1 is flow chart to illustrate a method for data de-duplication according to an example embodiment of the present invention.
FIG. 2 is a table to show access properties of data.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is flow chart to illustrate a method for data de-duplication according to an example embodiment of the present invention.

Referring to FIG. 1, a method for data de-duplication according to an example embodiment of the present invention may comprise a step S100 of obtaining access property of data based on input request or output request for the data, a step S200 of determining de-duplication unit of the data based on the access property, and a step S300 of performing de-duplication on the data based on the de-duplication unit.

Here, each step illustrated in FIG. 1 may be performed by an apparatus for data de-duplication illustrated in FIG. 8, and detail constitution and function of the apparatus will be explained later.

FIG. 2 is a table to show access properties of data.

Referring to FIG. 2, access properties of data may include an access time of data (a_time), a modification time of data (m_time), the number of sequential accesses on data (seqCount), the number of random accesses (randCount), and so on. Here, the access properties of data are not limited to above described properties, and may include other information which can represent input/output characteristics of data.

The access time of data (a_time) may mean a time when input request for the data (that is, data write request) or output request for the data (that is, data read request) is received. When the input request for the data is received, the apparatus for data de-duplication may obtain a time of receiving the input request for the data as the access time of the data, and store the obtained access time. For example, the apparatus may store a current time in a time field for a current data. Meanwhile, in a case that a stored access time already exists for the data, the apparatus may update the stored access time with a newly obtained access time.

On the other hand, when the output request for the data is received, the apparatus for data de-duplication may obtain a time of receiving the output request of data as the access time of the data, and store the obtained access time. For example, the apparatus may store a current time in a_time field for a current data. Meanwhile, in a case that a stored access time already exists, the apparatus may update the stored access time with a newly obtained access time.

The modification time of data (m_time) may mean a time when input request for the data is received. When the input request for the data is received, the apparatus for data de-duplication may obtain a time of receiving the input request for the data as the access time of the data, and store the obtained access time. For example, the apparatus may store a current time in m_time field for a current data. Meanwhile, in a case that a stored access time of the data already exists, the apparatus may update the stored access time with a newly obtained access time.

The number of sequential accesses on data (seqCount) may mean the number of accesses which increases when a current access is belonging to a sequential access. That is, when a current access request and a previous access request are continuous (For example, when a physical or logical number of the current access request is continuous with that of the previous access request, or when the current access request and the previous access request have any continuous trends), the number of sequential accesses on data may increase. On the contrary, the number of random accesses on data (randCount) may mean the number of accesses which increases when a current access is belonging to a random access. Here, the number of sequential accesses and the number of random accesses may mean accumulated number of sequential accesses or random accesses.

When the current access request and the previous access request are continuous, the apparatus may increase a seqCount field for the data which the current access request designates by 1. On the contrary, when the current access request and the previous access request are not continuous, the apparatus may increase a randCount field for the data which the current access request designates by 1.

Figure 3:
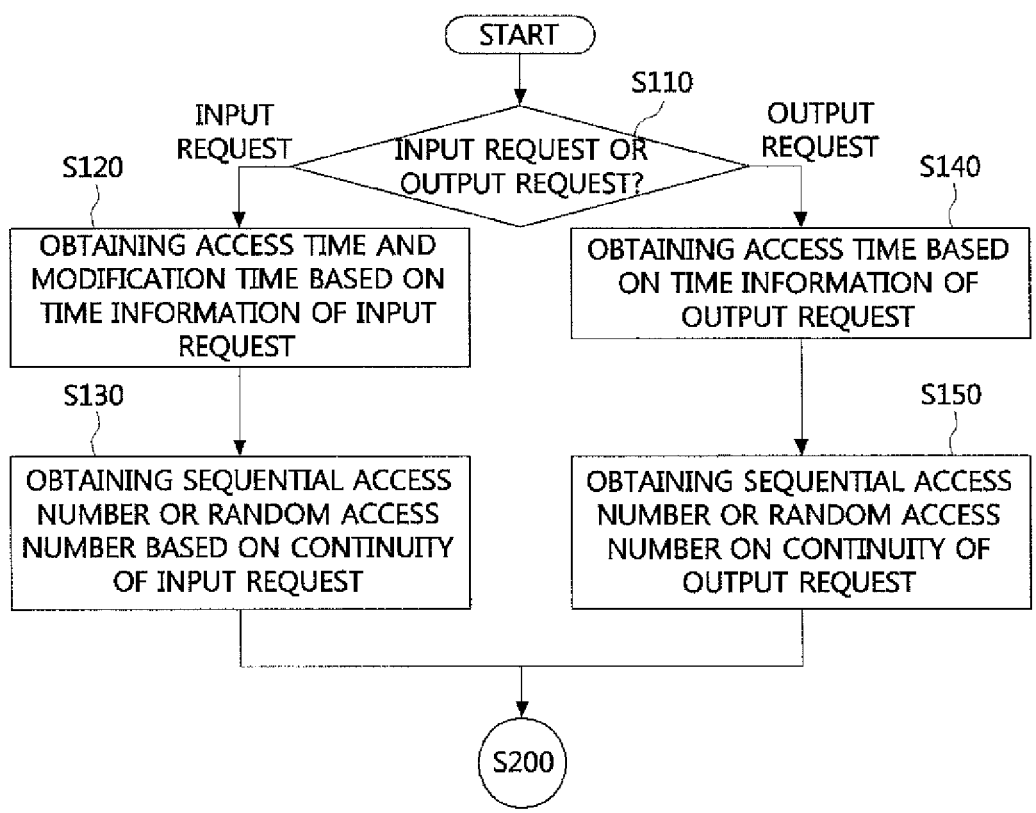
FIG. 3 is a flow chart to illustrate a step of obtaining access property in a method of data de-duplication according to an example embodiment of the present invention.

FIG. 3 is a flow chart to illustrate a step of obtaining access property in a method of data de-duplication according to an example embodiment of the present invention.

Referring to FIG. 3, the step S100 of obtaining access property of data may comprise a step S110 of determining whether a received access request is belonging to an input request or an output request; a step S120 of obtaining the access time and the modification time based on time information of the input request when the input request is received; and a step S130 of obtaining the number of sequential accesses on the data or the number of random accesses on the data based on continuity of the input request.

In addition, the step S100 of obtaining access property of data may further comprise a step S140 of obtaining the access time based on time information of the output request when the output request is received; and a step S150 of obtaining the number of sequential accesses on the data or the number of random accesses on the data based on continuity of the output request.

In the step S110, the apparatus for data de-duplication may determine whether a received access request is an input request or an output request. When the received request is an input request, the apparatus may perform the steps S120 and S130 as next steps. On the contrary, when the received request is an output request, the apparatus may perform the steps S140 and S150 as next steps.

In the step S120, the apparatus for data de-duplication may obtain the access time and the modification time based on time information of the input request. That is, the apparatus may obtain a time of receiving the data input request as the access time and the modification time, and store the obtained access time and modification time in a database. At this time, if stored access time already exists in the database, the apparatus may update the stored access time with the newly obtained access time. Meanwhile, if a stored modification time already exists in the database, the apparatus may update the stored modification time with the newly obtained modification time.

In the step S130, the apparatus for data de-duplication may obtain the number of sequential accesses on the data or the number of random accesses on the data based on continuity between the current input request and the previous access request. That is, the apparatus may increase a seqCount field for the data which the current input request designates by 1 when the current input request and the previous access request are continuous, and may increase a randCount field for the data which the current input request designates by 1 when the current input request and the previous access request are not continuous.

For example, if it is assumed that the number of sequential accesses on a specific data is 7 and the number of random accesses on the specific data is 5, the apparatus may increase the number of sequential accesses on the specific data to 8 when the current input request and the previous access request are continuous, and the apparatus may increase the number of random accesses on the specific data to 6 when the current input request and the previous access request are not continuous.

In the above description, an example in which the step S130 is performed after the step S120 is performed was explained. However, the performing order of the steps S120 and S130 is not limited to the above example. That is, the steps S120 and S130 may be performed at the same time, or the step S130 may be performed before the step S120 is performed.

In the step S140, the apparatus for data de-duplication may obtain the access time based on time information of the output request. That is, the apparatus may obtain a time of receiving the data output request as the access time, and store the obtained access time in the database. At this time, if stored access time already exists in the database, the apparatus may update the stored access time with the newly obtained access time.

In the step S150, the apparatus for data de-duplication may obtain the number of sequential accesses on the data or the number of random accesses on the data based on continuity between the current output request and the previous access request. That is, the apparatus may increase a seqCount field for the data which the current output request designates by 1 when the current output request and the previous access request are continuous, and may increase a randCount field for the data which the current output request designates by 1 when the current output request and the previous access request are not continuous.

For example, if it is assumed that the number of sequential accesses on a specific data is 7 and the number of random accesses on the specific data is 5, the apparatus may increase the number of sequential accesses on the specific data to 8 when the current output request and the previous access request are continuous, and the apparatus may increase the number of random accesses on the specific data to 6 when the current output request and the previous access request are not continuous.

In the above description, an example in which the step S150 is performed after the step S140 is performed was explained. However, the performing order of the steps S140 and S150 is not limited to the above explanation. That is, the steps S140 and S150 may be performed at the same time, or the step S150 may be performed before the step S140 is performed.

Figure 4:
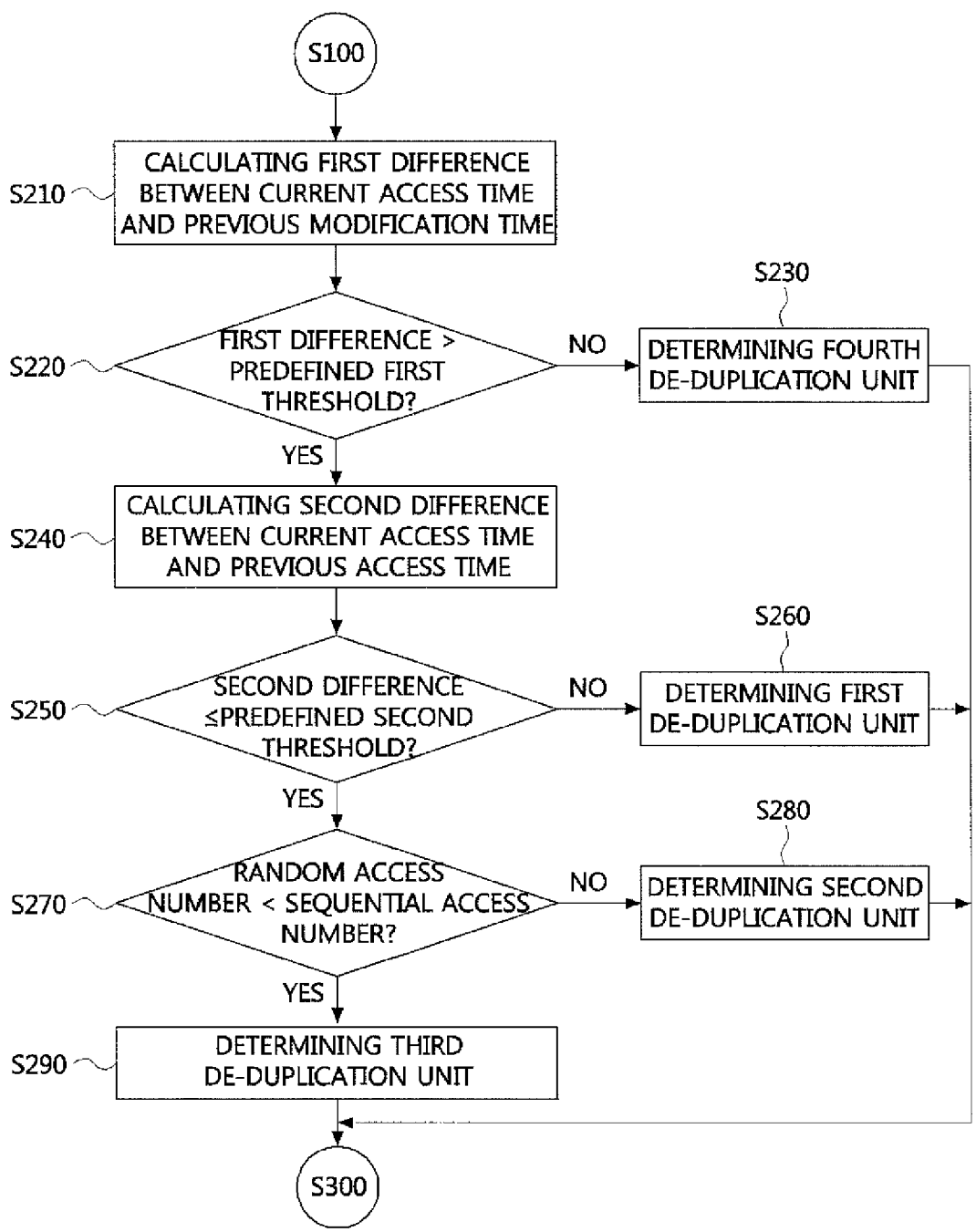
FIG. 4 is a flow chart to illustrate a step of determining de-duplication unit in a method for data de-duplication according to an example embodiment of the present invention.

FIG. 4 is a flow chart to illustrate a step of determining de-duplication unit in a method for data de-duplication according to an example embodiment of the present invention.

Referring to FIG. 4, the step S200 of determining de-duplication unit may comprise a step S210 of calculating a first difference between a current access time on the data and a previous modification time on the data; a step S220 of determining whether the first difference is in excess of a predefined first threshold; a step S230 of determining a fourth de-duplication unit having a lowest de-duplication probability as the de-duplication unit of the data when the first difference is equal to or less than the first threshold; a step S240 of calculating a second difference between the current access time on the data and the previous access time on the data when the first difference is in excess of the first threshold; a step of S250 of determining whether the second difference is equal to or less than a predefined second threshold; a step S260 of determining a first de-duplication unit having a highest de-duplication probability as the de-duplication unit of the data when the second difference is in excess of the second threshold; a step S270 of determining whether the number of random accesses on the data is equal to and less than the number of sequential accesses on the data when the second difference is equal to or less than the second threshold; a step S280 of determining a second de-duplication unit having a lower de-duplication probability than the first de-duplication unit as the de-duplication unit of the data when the second difference is equal to or less than the second threshold and the number of random accesses on the data is equal to and more than the number of sequential accesses on the data; and a step S290 of determining a third de-duplication unit having a lower de-duplication probability than the second de-duplication unit as the de-duplication unit of the data when the second difference is equal to or less than the second threshold and the number of random accesses on the data is less than the number of sequential accesses on the data.

Hereinafter, de-duplication unit determined in the step S200 will be explained by referring to FIG. 5.

FIG. 5 is a table to explain de-duplication units used in an example embodiment of the present invention.

Referring to FIG. 5, de-duplication units used for the present invention may be classified into four type of units such as a first de-duplication unit, a second de-duplication unit, a third de-duplication unit, and a fourth de-duplication unit.

The first de-duplication unit may be applied to data which are not used frequently. The data which are not used frequently may mean data having a greater difference between current access time and previous access time than a predefined threshold value. The first de-duplication unit may be configured to use the smallest chunk among all the de-duplication units, and so may realize the highest de-duplication probability among all the de-duplication units. That is, the first de-duplication unit may be used for providing high data de-duplication rate rather than low latency.

The second de-duplication unit may be applied to data which has more random accesses than sequential accesses. The second de-duplication unit may use chunk larger than that of the first de-duplication unit and smaller than a third de-duplication unit (explained later). Accordingly, the second de-duplication unit may provide relatively higher de-duplication probability (that is, the second de-duplication unit has data de-duplication rate lower than that of the first de-duplication unit and higher than that of the third de-duplication unit). Even though physical disarrangement occurs for data having frequent random accesses, performance of random accesses may not degrade. Thus, the second de-duplication unit may use relatively smaller size of chunk in order to provide high data de-duplication rate.

The third de-duplication unit may be applied to data which has more sequential accesses than random accesses. The third de-duplication unit may use chunk larger than that of the second de-duplication unit and smaller than a fourth de-duplication unit (explained later). Accordingly, the third de-duplication unit may provide relatively lower de-duplication probability (that is, the third de-duplication unit has data de-duplication rate lower than that of the second de-duplication unit and higher than that of the fourth de-duplication unit). That is, in order to provide low input/output latency for data having frequent sequential accesses, the third de-duplication unit may use relatively larger size of chunk.

The fourth de-duplication unit may be applied to data for which frequent input requests are received. The fourth de-duplication unit may use chunk larger than that of the third de-duplication unit. Accordingly, the fourth de-duplication unit may provide the lowest de-duplication probability among all the de-duplication units. Meanwhile, the fourth de-duplication unit may mean a data unit on which data de-duplication is not performed. That is, since data de-duplication is suitable for output-oriented data, data de-duplication may not be performed on input-oriented data.

Here, classification of de-duplication units is not restricted to the above example but configured variously. For example, the de-duplication unit may be classified into three types or five types. When the de-duplication unit is classified into three types, the first de-duplication unit may provide the highest de-duplication probability, and the second de-duplication unit may provide lower de-duplication probability than the first de-duplication unit, and the third de-duplication unit may provide lower de-duplication probability than the second de-duplication unit (that is, the lowest de-duplication rate).

Re-referring to FIG. 4, in the step S210, the apparatus may calculate a first difference between a current access time on the data and a previous access time on the data. That is, the apparatus may calculate the first difference which is a difference between a current time of access on the data and a previous time of modification on the data (that is, a modification time obtained from a previous input request on the data). Here, the first difference may represent how frequently the data is changed (that is, how frequent input requests are generated for the data).

In the step S220, the apparatus may determine whether the first difference is in excess of a predefined first threshold. Here, the first threshold may mean a threshold used to determine whether to perform data de-duplication or not, and may have a different value according to user configuration. For example, the first threshold may be set to 1 hour, 2 hours, 3 hours, and so on. When the first difference is equal to or less than the first threshold, the apparatus may perform the step S230 as a next step. When the first difference is in excess of the first threshold, the apparatus may perform the step S240 as a next step.

In the step S230, the apparatus may determine the fourth de-duplication unit as a de-duplication unit of the data. That is, when the first difference is equal to or less than the first threshold so that the data has frequent input requests, the apparatus may select the fourth de-duplication unit having the lowest de-duplication probability (or, data de-duplication is not performed on the fourth de-duplication unit) among the de-duplication units.

In the step S240, the apparatus may calculate a second difference between a current access time on the data and a previous access time on the data. That is, the apparatus may calculate the second difference which is a difference between a current access time on the data obtained from current input or output request on the data and a previous access time on the data (that is, obtained from previous input or output request on the data). Here, the second difference may mean how frequently accesses on the data occur.

In the step S250, the apparatus may determine whether the second difference is equal to or less than a predefined second threshold. Here, the second threshold may mean a threshold used to discriminate data having low access probability, and may have a different value according to user configuration. For example, the second threshold may be set to 1 hour, 2 hours, 3 hours, and so on. When the second difference is in excess of the second threshold, the apparatus may perform the step S260 as a next step. When the second difference is not in excess of the second threshold, the apparatus may perform the step S270 as a next step.

In the step S260, the apparatus may determine the first de-duplication unit having the highest probability of de-duplication as a de-duplication unit of the data. That is, when the second difference is in excess of the second threshold so that the data is not frequently used, the apparatus may select the first de-duplication unit having the highest de-duplication probability for the data.

In the step S270, the apparatus may determine whether the number of random accesses on the data is less than the number of sequential accesses on the data. When the number of random accesses on the data is equal to or more than the number of sequential accesses on the data, the apparatus may perform the step S280 as a next step. When the number of random accesses on the data is less than the number of sequential accesses on the data, the apparatus may perform the step S290 as a next step.

In the step S280, the apparatus may determine the second de-duplication unit having a lower probability of de-duplication than the first de-duplication unit as a de-duplication unit of the data. That is, when the number of random accesses on the data is equal to or more than the number of sequential accesses on the data so that the data has frequent random accesses, the apparatus may select the second de-duplication unit having relatively higher de-duplication probability for the data.

In the step S290, the apparatus may determine the third de-duplication unit having a lower probability of de-duplication than the second de-duplication unit as a de-duplication unit of the data. That is, when the number of random accesses on the data is less than the number of sequential accesses on the data so that the data has frequent sequential accesses, the apparatus may select the third de-duplication unit having relatively lower de-duplication probability for the data.

Figure 7:
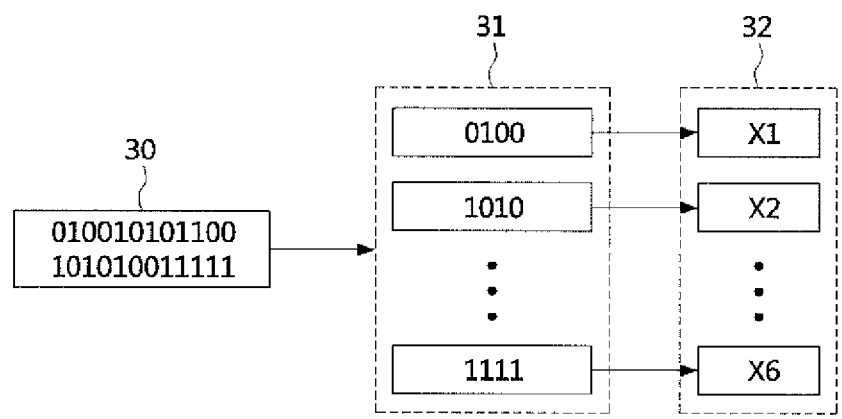
FIG. 7 is a conceptual diagram to illustrate a step of generating unique identifier corresponding to data block.

FIG. 6 is a flow chart to illustrate a step of performing de-duplication in a method for data de-duplication according to an example embodiment of the present invention, and FIG. 7 is a conceptual diagram to illustrate a step of generating unique identifier corresponding to data block.

Referring to FIGS. 6 and 7, a step S300 of performing de-duplication will be explained in detail.

The step S300 of a method for data de-duplication according to an example embodiment of the present invention may comprise a step S310 of generating at least one data block of the data based on the de-duplication unit; a step S320 of generating unique identifiers for the at least one data block; a step S330 of determining whether the unique identifier is in an index table or not; a step S340 of storing the unique identifier and the data block corresponding to the unique identifier when the unique identifier is not in the index table; and a step S350 of removing data block corresponding to the unique identifier when the unique identifier is in the index table.

In the step S310, the apparatus may generate at least one data block of the data based on the de-duplication unit. The apparatus may determine size of chunk according to the determined de-duplication unit. That is, the apparatus may generate at least one data block based on chunk size corresponding to the first de-duplication unit, or generate at least one data block based on chunk size corresponding to the second de-duplication unit, or generate at least one data block based on chunk size corresponding to the third de-duplication unit, or generate at least one data block based on chunk size corresponding to the fourth de-duplication unit. Meanwhile, if the fourth de-duplication unit means a unit on which data de-duplication is not performed, the apparatus may not generate data blocks for the fourth de-duplication unit.

Referring to FIG. 7, the apparatus may generate a plurality of data blocks 31 from the data 30 based on the above described step 310.

In the step S320, the apparatus may generate unique identifiers for generated data blocks. Here, the apparatus may generate the unique identifiers using hash algorithms such as SHA-1, SHA-2, SHA-3, and so on. However, a method for generating unique identifiers is not restricted to the above explanation, and various known methods may be used to generate unique identifiers corresponding to the plurality of data blocks.

Referring to FIG. 7, the apparatus may generate unique identifiers 32 each of which corresponds to each of data blocks 31 based on the above described step 320.

In the step S330, the apparatus may determine whether generated unique identifiers already exist in an index table. The index table may include unique identifiers and data blocks corresponding to the unique identifiers. Here, in a case that a unique identifier exists in the index table, the case may mean that a data block corresponding to the unique identifier has been already stored. On the contrary, in a case that a unique identifier does not exist in the index table, the case may mean that a data block corresponding to the unique identifier does not have been stored. When the unique identifier does not exist in the index table, the apparatus may perform the step S340 as a next step. When the unique identifier exists in the index table, the apparatus may perform the step S350 as a next step.

In the step S340, the apparatus may store unique identifiers and data blocks corresponding to the unique identifiers. That is, since data blocks corresponding to the unique identifiers do not have been stored, the apparatus may store unique identifiers and data blocks corresponding to the unique identifiers in the database (or, index table) without performing de-duplication.

In the step S350, the apparatus may remove data blocks corresponding to the unique identifiers. That is, since data blocks corresponding to the unique identifiers already have been stored, the apparatus may perform de-duplication (removing data blocks corresponding to the unique identifier).

The methods according to the present invention may be implemented as program commands that can be executed by various computer means and written to a computer-readable recording medium. The computer-readable recording medium may include a program command, a data file, a data structure, etc. alone or in combination. The program commands written to the medium are designed or configured especially for the present invention, or known to those skilled in computer software.

Examples of the computer-readable recording medium include a hardware device configured especially to store and execute a program command, such as a ROM, a RAM, and a flash memory. Examples of a program command include a premium language code executable by a computer using an interpreter as well as a machine language code made by a compiler. The hardware device may be configured to operate as one or more software modules to implement the present invention or vice versa.

Figure 8:
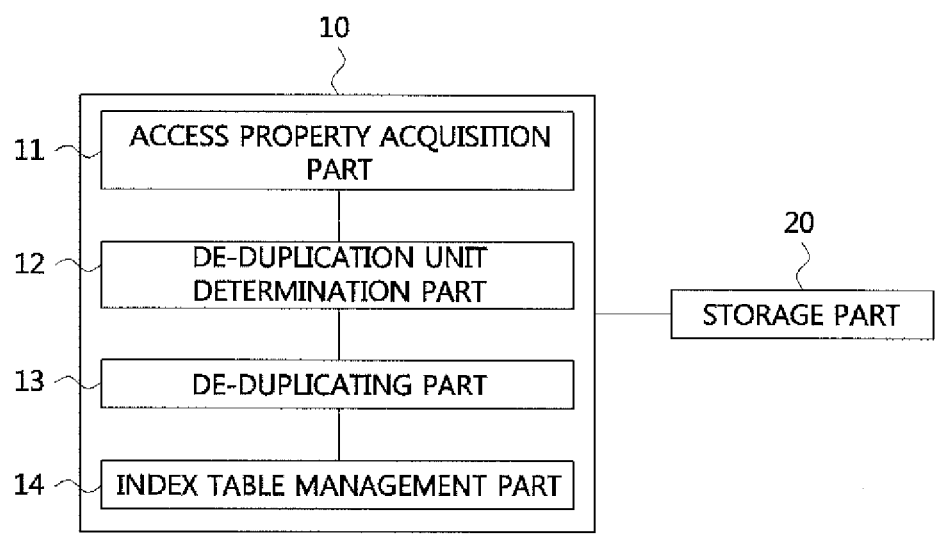
FIG. 8 is a block diagram to illustrate an apparatus for data de-duplication according to an example embodiment of the present invention.

FIG. 8 is a block diagram to illustrate an apparatus for data de-duplication according to an example embodiment of the present invention.

Referring to FIG. 8, the apparatus for data de-duplication may comprise a processing part 10 and a storage part 20.

The processing part 10 may be configured to obtain access property of data based on input request or output request for the data, determine de-duplication unit of the data based on the access property, and perform de-duplication on the data based on the de-duplication unit.

Here, the processing part 10 may comprise an access property acquisition part 11, a de-duplication unit determination part 12, a de-duplicating part 13, and an index table management part 14 as logical entities. Meanwhile, the processing part 10 may comprise a processor and a memory as physical entities. The processor may be a general purpose processor (for example, a Central Processing Unit (CPU) or a Graphics Processing Unit (CPU)) or a dedicated processor designed for performing a method of de-duplication according to the present invention. The memory stores program codes for executing a method for data de-duplication according to the present invention. That is, the processor may read out the program codes stored in the memory, and perform the steps of the method for data de-duplication based on the program codes.

Here, access properties of data may include an access time of data (a_time), a modification time of data (m_time), the number of sequential accesses on data (seqCount), the number of random accesses (randCount), and so on. Here, the access properties of data are not limited to above described properties, and may include other information which can represent input/output characteristics of data.

The access time of data (a_time) may mean a time when input request for the data (that is, data write request) or output request for the data (that is, data read request) is received. The modification time of data (m_time) may mean a time when input request for the data is received. The number of sequential accesses on data (seqCount) may mean the number of accesses which increases when a current access is belonging to a sequential access. The number of random accesses on data (randCount) may mean the number of accesses which increases when a current access is belonging to a random access.

When the access property is obtained, the processing part 10 may obtain the access time and the modification time based on time information of the input request when the input request is received, and obtain the number of sequential accesses on the data or the number of random accesses on the data based on continuity of the input request. Also, the processing part 10 may obtain the access time based on time information of the output request when the output request is received, and obtain the number of sequential accesses on the data or the number of random accesses on the data based on continuity of the output request. Here, the access property may be obtained through the access property acquisition part 11 of the processing part 10.

Specifically, the processing part 10 may determine whether a received request is an input request or an output request. When the received request is an input request, the processing part 10 may obtain the access time and the modification time based on time information of the input request, and store the access time and the modification time in the storage part 20. In addition, the processing part 10 may increase the number of sequential accesses on the data which the current input request designates by 1 when the current input request and the previous access request are continuous, and may increase the number of random accesses on the data which the current input request designates by 1 when the current input request and the previous access request are not continuous.

In order to determine de-duplication unit for the data, the processing part 10 may calculate the first difference which is a difference between a current time of access on the data and a previous time of modification on the data, and determine the fourth de-duplication unit having the lowest de-duplication probability as a de-duplication unit of the data when the first difference is equal to or less than a first predefined threshold. On the other hand, the processing part 2 may calculate a second difference between a current access time on the data and a previous access time on the data when the first difference is more than the first threshold.

Here, the processing part 10 may determine the first de-duplication unit having the highest de-duplication probability as a de-duplication unit of the data when the second difference is in excess of a second predefined threshold, and may determine whether the number of random accesses on the data is equal to or more than the number of sequential accesses on the data when the second difference is not in excess of the second predefined threshold.

Here, the processing part 10 may determine the second de-duplication unit having a lower de-duplication probability than the first de-duplication unit as a de-duplication unit of the data when the number of random accesses on the data is equal to or more than the number of sequential accesses on the data, and determine the third de-duplication unit having a lower de-duplication probability than the second de-duplication unit as a de-duplication unit of the data when the number of random accesses on the data is less than the number of sequential accesses on the data.

The de-duplication unit may be determined in the de-duplication unit determination part 12 in the processing part 10.

Here, de-duplication units used for the present invention may be classified into four type of units such as a first de-duplication unit, a second de-duplication unit, a third de-duplication unit, and a fourth de-duplication unit. The first de-duplication unit may be applied to data which are not used frequently, and the second de-duplication unit may be applied to data which has more random accesses than sequential accesses on itself, and the third de-duplication unit may be applied to data which has more sequential accesses than random accesses on itself, and the fourth de-duplication unit may be applied to data for which frequent input requests are received.

Specifically, the processing part 10 may calculate a first difference which is a difference between a current time of access on the data and a previous time of modification on the data (that is, a modification time obtained from a previous input request on the data). Here, the first difference may represent how frequently the data is changed (that is, how frequent input requests are generated on the data).

The processing part 10 may determine whether the first difference is in excess of a predefined first threshold. Here, the first threshold may mean a threshold used to determine whether to perform data de-duplication, and may have a different value according to user configuration.

When the first difference is equal to or less than the first threshold so that the data has frequent input requests, the processing part 10 may select the fourth de-duplication unit having the lowest data de-duplication probability (or, which data de-duplication is not performed on) among the de-duplication units.

On the other hand, when the first difference is in excess of the first threshold, the processing part 10 may calculate a second difference which is a difference between a current access time on the data obtained from current input or output request on the data and a previous access time on the data (that is, obtained from previous input or output request on the data). Here, the second difference may mean how frequently accesses on the data occur.

The processing part 10 may determine whether the second difference is equal to or less than a predefined second threshold. Here, the second threshold may mean a threshold used to discriminate data having low access probability, and may have a different value according to user configuration.

When the second difference is in excess of the second threshold so that the data is not frequently used, the processing part 10 may determine the first de-duplication unit having the highest probability of de-duplication as a de-duplication unit of the data. Meanwhile, when the second difference is not in excess of the second threshold, the processing part 10 may determine whether the number of random accesses on the data is less than the number of sequential accesses on the data.

When the number of random accesses on the data is equal to or more than the number of sequential accesses on the data so that the data has frequent random accesses, the processing part 10 may select the second de-duplication unit having relatively higher data de-duplication probability for the data. Meanwhile, when the number of random accesses on the data is less than the number of sequential accesses on the data so that the data has frequent sequential accesses, the processing part 10 may select the third de-duplication unit having relatively lower data de-duplication probability for the data.

In order to perform data de-duplication, the processing part 10 may generate at least one data block of the data based on the de-duplication unit, generate unique identifier for the at least one data block, determine whether the unique identifier is in an index table or not, remove data block corresponding to the unique identifier when the unique identifier is in the index table, and store the unique identifier and the data block corresponding to the unique identifier when the unique identifier is not in the index table.

Here, data de-duplication may be performed in the de-duplicating part 13 in the processing part 10. Also, storing, deleting, and updating information in the index table may be performed in the index table management part 14 in the processing part 10.

Specifically, the processing part 10 may generate at least one data block based on chunk size corresponding to the first de-duplication unit, or generate at least one data block based on chunk size corresponding to the second de-duplication unit, or generate at least one data block based on chunk size corresponding to the third de-duplication unit, or generate at least one data block based on chunk size corresponding to the fourth de-duplication unit. Meanwhile, when the fourth de-duplication unit means a unit on which data de-duplication is not performed, the processing part 10 may not generate a data block for the fourth de-duplication unit.

The processing part 10 may generate the unique identifier using hash algorithms such as SHA-1, SHA-2, SHA-3, and so on. However, a method for generating unique identifier is not restricted to the above explanation, and various known methods may be used to generate unique identifiers corresponding to the plurality of data blocks.

The processing part 10 may determine whether generated unique identifiers already exist in an index table. In a case that unique identifiers do not exist in the index table, and so data blocks corresponding to the unique identifiers do not have been stored, the processing part 10 may store unique identifiers and data blocks corresponding to the unique identifiers in the database (or, index table) without performing de-duplication. On the contrary, in a case that unique identifiers exist in the index table, and so data blocks corresponding to the unique identifiers have been already stored, the processing part 10 may perform de-duplication (removing data blocks corresponding to the unique identifier).

The storage part 20 may store information which is being processed or which will be processed in the processing part 10. For example, the processing part 20 may store the data input requests, the data output requests, the access properties of data, the first difference, the first predefined threshold, the second difference, the second predefined threshold, the index table, information on de-duplication units, and so on.

According to the present invention, data de-duplication rate (that is, size of chunk) may be determined adaptively based on input/output characteristics of data. Also, data de-duplication may be performed based on the determined data de-duplication rate so as to provide low input/output latency.

While the example embodiments of the present invention and their advantages have been described in detail, it should be understood that various changes, substitutions and alterations may be made herein without departing from the scope of the invention.

What is claimed is:

1. A method for data de-duplication, performed in an apparatus for data de-duplication, comprising:
    obtaining access property including access time on data, modification on the data, a number of sequential accesses on the data, and a number of random accesses on the data based on input request or output request for the data;
    calculating a first difference between a current access time on the data and a previous modification time on the data;
    determining a fourth de-duplication unit having a lowest de-duplication probability as the de-duplication unit of the data when the first difference is equal to or less than a predefined first threshold;
    calculating a second difference between the current access time on the data and the previous access time on the data when the first difference is in excess of the first threshold;
    determining a first de-duplication unit having a highest de-duplication probability as the de-duplication unit of the data when the second difference is in excess of a predefined second threshold;
    determining a second de-duplication unit having a lower de-duplication probability than the first de-duplication unit as the de-duplication unit of the data when the second difference is equal to or less than the second threshold and the number of random accesses on the data is equal to and more than the number of sequential accesses on the data;
    determining a third de-duplication unit having a lower probability of being de-duplicated than the second de-duplication unit as the de-duplication unit of the data when the second difference is equal to or less than the second threshold and the number of random accesses on the data is less than the number of sequential accesses on the data;
    generating at least one data block of the data based on the determined de-duplication unit according to the access property, wherein the determined de-duplication unit is one of the first de-duplication unit, second de-duplication unit, third de-duplication unit, and fourth de-duplication unit;
    generating unique identifier for the at least one data block; and
    performing de-duplication on the data based on whether the unique identifier is in an index table or not.

2. The method of claim 1, wherein the obtaining access property comprises:
    obtaining the access time and the modification time based on time information of the input request when the input request is received; and
    obtaining the number of sequential accesses on the data or the number of random accesses on the data based on continuity of the input request.

3. The method of claim 1, wherein the obtaining access property comprises:
    obtaining the access time based on time information of the output request when the output request is received; and
    obtaining the number of sequential accesses on the data or the number of random accesses on the data based on continuity of the output request.

4. The method of claim 1, wherein de-duplication is not performed for the fourth de-duplication unit.

5. The method of claim 1, wherein the de-duplication unit is classified into at least one de-duplication units each of which has different de-duplication probability.

6. The method of claim 1, wherein the performing de-duplication on the data comprises:
    determining whether the unique identifier is in an index table or not;
    removing a data block corresponding to the unique identifier when the unique identifier is in the index table; and
    storing the unique identifier and the data block corresponding to the unique identifier when the unique identifier is not in the index table.

7. The method of claim 6, wherein the unique identifier is generated using a hash algorithm.

8. An apparatus for data de-duplication, comprising:
    a processing part configured to:
        obtain access property including access time on data, modification on the data, a number of sequential accesses on the data, and a number of random accesses on the data based on input request or output request for the data;
        calculate a first difference between a current access time on the data and a previous modification time on the data;
        determine a fourth de-duplication unit having a lowest de-duplication probability as the de-duplication unit of the data when the first difference is equal to or less than a predefined first threshold;
        calculate a second difference between the current access time on the data and the previous access time on the data when the first difference is in excess of the first threshold;
        determine a first de-duplication unit having a highest de-duplication probability as the de-duplication unit of the data when the second difference is in excess of a predefined second threshold;
        determine a second de-duplication unit having a lower de-duplication probability than the first de-duplication unit as the de-duplication unit of the data when the second difference is equal to or less than the second threshold and the number of random accesses on the data is equal to and more than the number of sequential accesses on the data;
        determine a third de-duplication unit having a lower de-duplication probability than the second de-duplication unit as the de-duplication unit of the data when the second difference is equal to or less than the second threshold and the number of random accesses on the data is less than the number of sequential accesses on the data;
        generate at least one data block of the data based on the determined de-duplication unit according to the access property wherein the determined de-duplication unit is one of the first de-duplication unit, second de-duplication unit, third de-duplication unit, and fourth de-duplication unit;
        generate unique identifier for the at least one data block; and
        perform de-duplication on the data based on the de-duplication unit; and a storage part configured to store information which is processed or has been processed in the processing part.

9. The apparatus of the claim 8, wherein the processing part is further configured to obtain the access time and the modification time based on time information of the input request when the input request is received, and obtain the number of sequential accesses on the data or the number of random accesses on the data based on continuity of the input request.

10. The apparatus of the claim 8, wherein the processing part is further configured to obtain the access time based on time information of the output request when the output request is received, and obtain the number of sequential accesses on the data or the number of random accesses on the data based on continuity of the output request.

11. The apparatus of the claim 8, wherein de-duplication is not performed for the fourth de-duplication unit.

12. The apparatus of the claim 8, wherein the de-duplication unit is classified into at least one de-duplication units each of which has different de-duplication probability.

13. The apparatus of the claim 8, wherein the processing part is further configured to determine whether the unique identifier is in an index table or not, remove a data block corresponding to the unique identifier when the unique identifier is in the index table, and store the unique identifier and the data block corresponding to the unique identifier when the unique identifier is not in the index table.

14. The apparatus of the claim 13, wherein the unique identifier is generated using a hash algorithm.

\* \* \* \* \*